United States Patent
Yanada et al.

(10) Patent No.: US 7,399,972 B2
(45) Date of Patent: Jul. 15, 2008

(54) COMPONENT FOR RADIATION DETECTOR AND RADIATION DETECTOR

(75) Inventors: Toshikazu Yanada, Gunma (JP); Takashi Yamada, Gunma (JP); Shigenori Sekine, Gunma (JP)

(73) Assignee: Nihon Kessho Kogaku Co., Ltd., Gunma (JP)

( * ) Notice: Subject to any disclaimer, the term of this patent is extended or adjusted under 35 U.S.C. 154(b) by 10 days.

(21) Appl. No.: 11/448,709

(22) Filed: Jun. 8, 2006

(65) Prior Publication Data

US 2007/0007461 A1   Jan. 11, 2007

Related U.S. Application Data

(60) Provisional application No. 60/690,132, filed on Jun. 14, 2005.

(30) Foreign Application Priority Data

Jun. 9, 2005   (JP) .............................. 2005-170163

(51) Int. Cl.
   *G01T 1/20* (2006.01)
   *G01T 1/24* (2006.01)
(52) U.S. Cl. .............................. 250/361 R; 250/370.11

(58) Field of Classification Search ............. 250/361 R, 250/370.11
See application file for complete search history.

(56) References Cited

U.S. PATENT DOCUMENTS

| 6,384,417 | B1 * | 5/2002 | Okumura et al. ............. 250/367 |
| 7,002,155 | B2 * | 2/2006 | Miyata et al. ........... 250/370.11 |
| 2002/0153492 | A1 * | 10/2002 | Sekine et al. ........... 250/370.11 |
| 2003/0234363 | A1 * | 12/2003 | Sekine et al. ........... 250/370.11 |

FOREIGN PATENT DOCUMENTS

JP   2003-084066 A   3/2003

* cited by examiner

*Primary Examiner*—David P. Porta
*Assistant Examiner*—Carolyn Igyarto
(74) *Attorney, Agent, or Firm*—Sughrue Mion, PLLC

(57) ABSTRACT

A group of scintillator elements that convert an incident radiation into a light is one-dimensionally arranged. A photodiode array includes a group of photodiode elements that are arranged corresponding to arrangement positions of the respective scintillator elements, with detection surfaces formed substantially parallel to the incidence direction of the radiation. A reflection thin film is formed on a rear surface of the photodiode array in such a manner that the reflection thin film covers surfaces of the scintillator elements of the scintillator array that is fixed adjacent to the photodiode array.

9 Claims, 5 Drawing Sheets

100
COMPONENT FOR RADIATION DETECTOR AND RADIATION DETECTOR

This application claims benefit of application claims benefit of Provisional Application No. 60/690,132 filed on Jun. 14, 2005 and Japan Patent Application No. 2005-179163 filed on Jun. 9, 2005. The disclosures of which are incorporated herein by reference in their entirety.

BACKGROUND OF THE INVENTION

1. Field of the Invention

The present invention relates to a radiation detector component for converting an incident radiation into a light and detecting the converted light to photograph a radiation image and a radiation detector, and more particularly, to a radiation detector component a radiation detector for forming a two-dimensional array to photograph the radiation image.

2. Description of the Related Art

Conventionally, an X-ray CT apparatus used in medical institutes and the like photographs an internal structure of a patient by irradiating an X-ray on the patient. Specifically, the X-ray CT apparatus has an X-ray irradiation source and a radiation detector with a structure in which an X-ray detecting unit, which is arranged to be opposed to the X-ray irradiation source via the patient, is arranged in a one-dimensional array shape. The detector has a function of converting a received X-ray into an electric signal and includes a scintillator element that converts the X-ray into a visible ray and a photodiode element that converts the visible ray into an electric signal. The X-ray CT apparatus receives an X-ray that has passed through the patient with this radiation detector and records an electric signal obtained based on this X-ray received. The X-ray CT apparatus varies an angle for irradiating an X-ray to repeat reception of the X-ray while maintaining a positional relation between the X-ray irradiation source and the radiation detector. Thereafter, the X-ray CT apparatus applies processing such as convolution and back-projection to the electric signal obtained to reconstitute an image of a section (a slice) of the patient through which the X-ray has passed.

In particular, in recent years, in a multi-slice X-ray CT apparatus that can simultaneously photograph a plurality of slices by irradiating an X-ray once, a plurality of array-like X-ray detecting units are arranged in association with the slices. The multi-slice X-ray CT apparatus collects X-rays, which have passed through the respective slices, to reconstitute slice images. Therefore, the multi-slice X-ray CT apparatus includes a radiation detector in which the detecting units are arranged in a two-dimensional array shape rather than a one-dimensional array shape.

As a conventional radiation detector, there is a radiation detector in which scintillator elements and photodiode elements are arranged to be adjacent to each other with respect to an incidence direction of a radiation and detection surfaces of the photodiode elements are arranged substantially parallel to the incidence direction of the radiation (see, for example, Japanese Patent Application Laid-Open No. 2003-84066).

In the conventional radiation detector, thickness of a reflection film applied on surfaces that are peripheral edges of the scintillator elements and substantially parallel to the incidence direction of the radiation is added to thickness of a substrate forming the photodiode elements. Thus, there is a problem in that a detection area for the radiation viewed from the incidence direction of the radiation decreases, detection sensitivity falls, and it is impossible to obtain high resolution.

SUMMARY OF THE INVENTION

It is an object of the present invention to at least partially solve the problems in the conventional technology.

A radiation detector component according to one aspect of the present invention includes a scintillator array in which a group of scintillator elements that convert an incident radiation into a light is one-dimensionally arranged and a reflection film is formed on a surface of each of the scintillator elements perpendicular to an incidence direction of the radiation; and a photodiode array that includes a group of photodiode elements that are arranged corresponding to arrangement positions of the respective scintillator elements, with detection surfaces formed substantially parallel to the incidence direction of the radiation, at least the detection surfaces of the photodiode elements being fixed on the scintillator array. The photodiode array includes a reflection thin film formed on a rear surface of the photodiode array in such a manner that the reflection thin film covers surfaces of the scintillator elements of the scintillator array that is fixed adjacent to the photodiode array.

A radiation detector according to another aspect of the present invention includes a plurality of radiation detector components. Each of the radiation detector components includes a scintillator array in which a group of scintillator elements that convert an incident radiation into a light is one-dimensionally arranged and a reflection film is formed on a surface of each of the scintillator elements perpendicular to an incidence direction of the radiation; and a photodiode array that includes a group of photodiode elements that are arranged corresponding to arrangement positions of the respective scintillator elements, with detection surfaces formed substantially parallel to the incidence direction of the radiation. At least the detection surfaces of the photodiode elements are fixed on the scintillator array. The photodiode array includes a reflection thin film formed on a rear surface of the photodiode array in such a manner that the reflection thin film covers surfaces of the scintillator elements of the scintillator array that is fixed adjacent to the photodiode array. The radiation detector components are arranged perpendicular to the incidence direction of the radiation to form a two-dimensional array.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
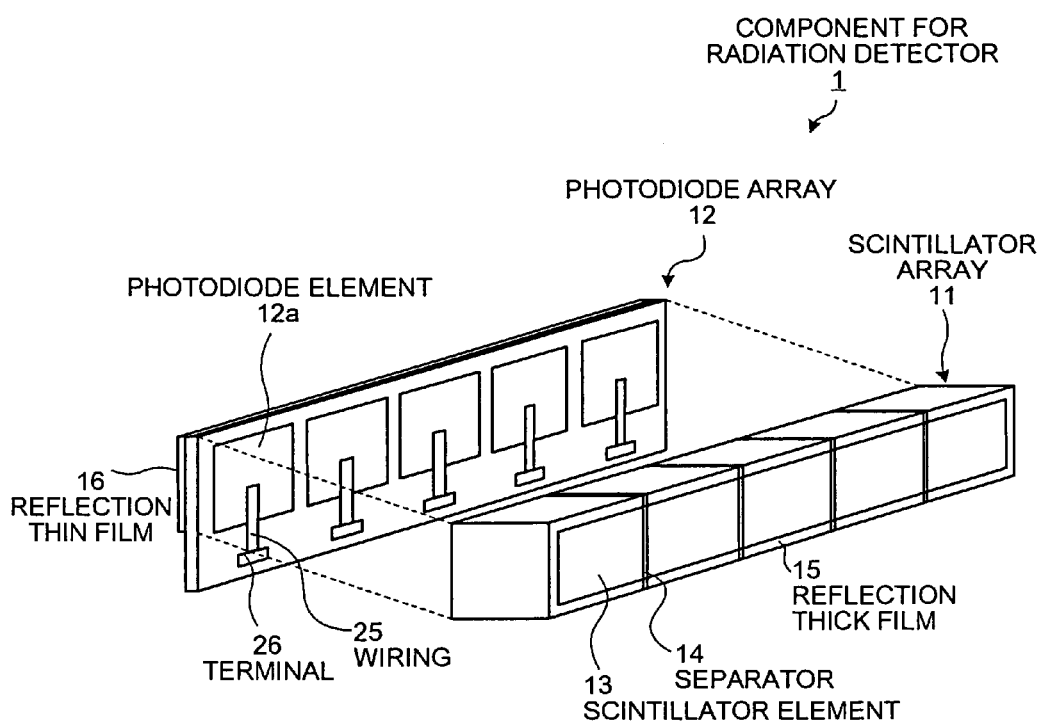
FIG. 1 is a disassembled perspective view of a radiation detector component according to a first embodiment of the present invention.
Figure 2:
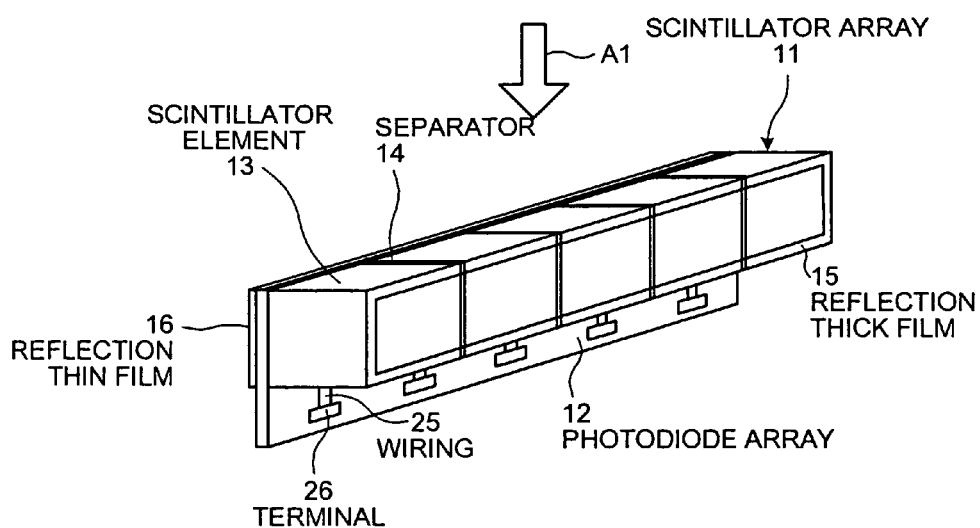
FIG. 2 is a perspective view of the radiation detector component according to the first embodiment.
Figure 3:
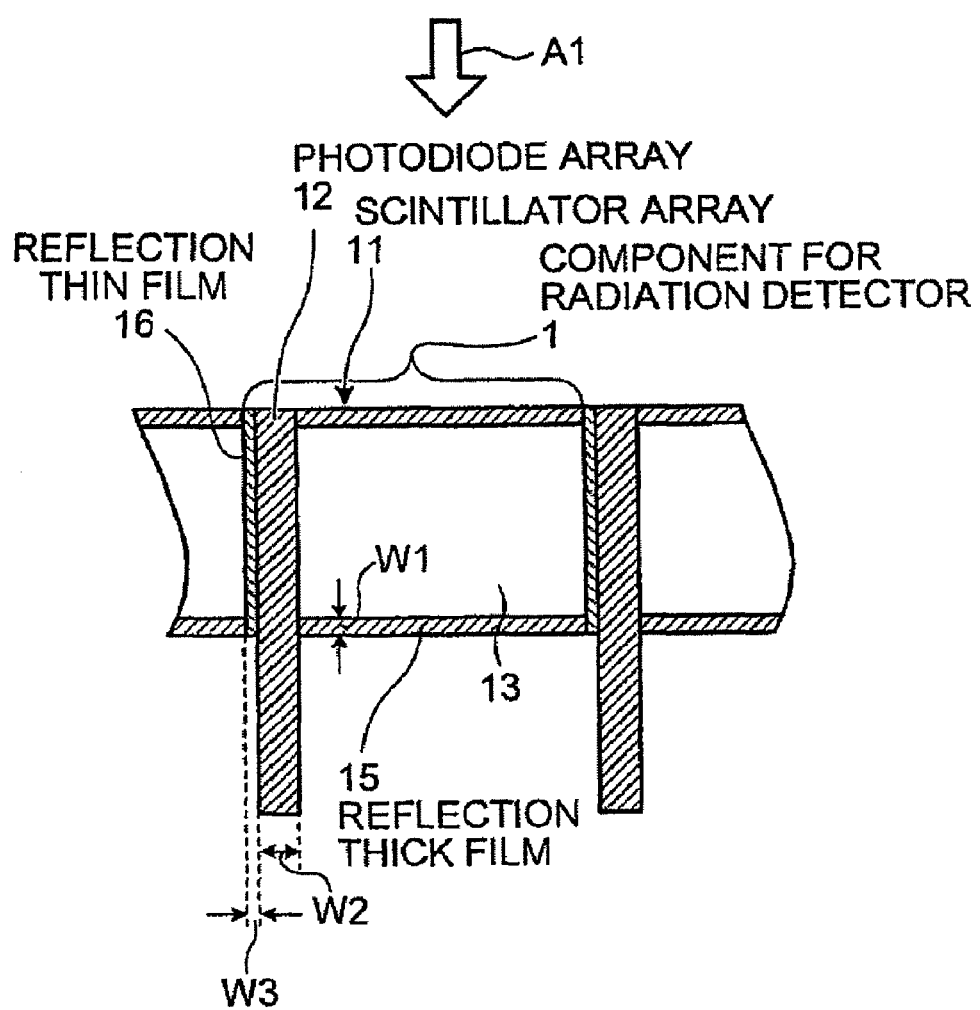
FIG. 3 is a sectional view of a two-dimensional array of the radiation detector components according to the first embodiment.
Figure 4:
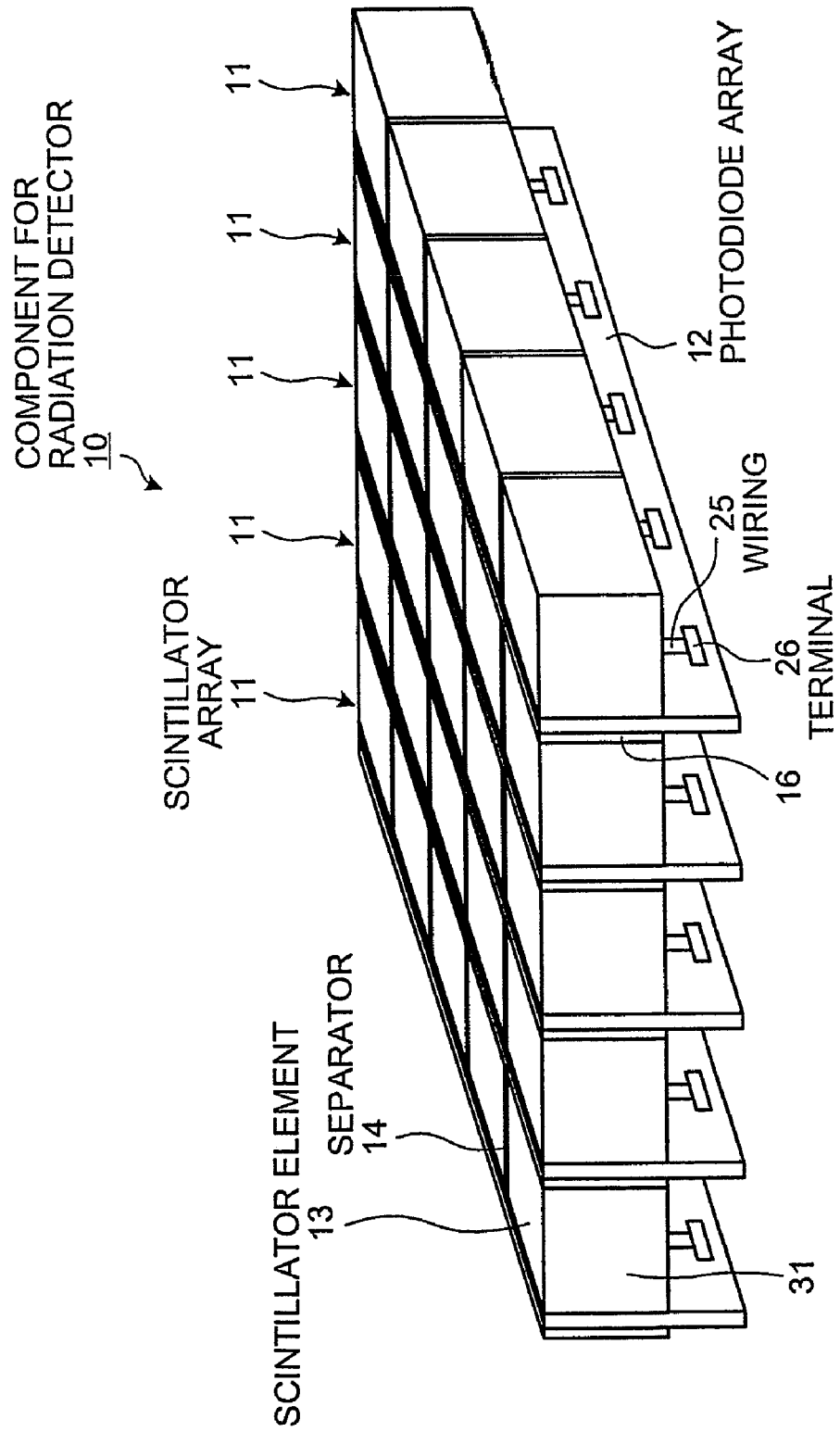
FIG. 4 is a perspective view of a schematic constitution of a radiation detector in which the radiation detector components according to the first embodiment are two-dimensionally arranged.

FIG. 1 is a disassembled perspective view of a radiation detector component 1 according to a first embodiment of the present invention. FIG. 2 is a perspective view of the radiation detector component 1 according to the first embodiment. FIG. 3 is a sectional view of a two-dimensional array of the radiation detector components 1 according to the first embodiment. FIG. 4 is a perspective view of a schematic constitution of a radiation detector 10 in which the radiation detector components 1 according to the first embodiment are two-dimensionally arranged.

The radiation detector component 1 includes a scintillator array 11 and a photodiode array 12. In the scintillator array 11, a plurality of scintillator elements 13 that converts a radiation such as an X-ray or a γ ray into light are one-dimensionally arranged substantially perpendicularly to an incidence direction A1 of the radiation. Separators 14 are provided among the respective scintillator elements 13. A reflection thick film 15 with film thickness of about several hundred micrometers that reflects the light converted is formed on surfaces of the respective scintillator elements 13 perpendicular to the incidence direction A1 and sides of the scintillator elements 13 at the ends of the scintillator array 11.

On the other hand, in the photodiode array 12, photodiode elements 12a are formed on a semiconductor substrate of Si or the like to be arranged in association with positions of the respective scintillator elements 13 as photoelectric conversion elements that convert light converted by the respective scintillator elements 13 into an electric signal. The respective scintillator elements 13 and the respective photodiode elements 12a are joined by an optical bonding agent to be in contact with each other. Therefore, light-receiving surfaces of the respective photodiode elements 12a are arranged substantially horizontally to the incidence direction A1 of the radiation. In other words, the semiconductor substrate surface of the photodiode array 12 is substantially parallel to the incidence direction A1.

On the rear surface of the photodiode array 12, that is, an opposite surface of the surface on which the photodiode elements 12a are formed, a reflection thin film 16 of Al with thickness of about several micrometers formed by vapor deposition, sputtering, or the like is provided with a positional relation for covering an area of a side of the scintillator array 11. When the reflection thin film 16 of Al is formed on the semiconductor substrate of Si, it is possible to obtain reflectance equal to or higher than 80%.

In the photodiode array 12, terminals 26 that extract detection signals of the respective photodiode elements 12a are formed on the semiconductor substrate. Wirings 25 that connect the respective photodiode elements 12a and the respective terminals 26 are formed on the semiconductor substrate.

A reflection film is not formed on surfaces of the respective scintillator elements 13 joined to the photodiode elements 12a and opposite surfaces of the surfaces. Thus, the light converted by the respective scintillator elements 13 is emitted from these surfaces. Therefore, in the scintillator array 11 alone, the converted light is emitted to the side of the respective photodiode elements 12a and the opposite side of the respective photodiode elements 12a. However, as shown in FIGS. 3 and 4, when the radiation detector component 1 is arranged and detection cells including pairs of the scintillator elements 13 and the photodiode elements 12a are two-dimensionally arranged, a surface of the scintillator array 11 on the opposite side of the photodiode elements 12a is covered by the reflection thin film 16 of the scintillator array 11 adjacent to the surface. Light converted by the scintillator elements 13 is reflected and, eventually, the converted light is emitted only to the photodiode elements 12a side.

As a result, the photodiode elements 12a can efficiently receive the light converted by the scintillator elements 13. As shown in FIG. 3, it is possible to significantly reduce thickness of the reflection thin film 16 compared with a reflection thick film 15. Specifically, the thickness of the reflection thin film 16 on a surface on which the detection cells are two-dimensionally arranged is reduced to be negligibly small compared with the conventional a radiation detector component shown in FIG. 3 in which film thickness W1 of the reflection thick film 15 is set to 100 micrometers, thickness W2 of the photodiode array 12 is set to 200 micrometers, film thickness W3 of the reflection thin film 16 is set to 1 micrometer, and surfaces of the scintillator elements 13 other than surfaces on the photodiode elements 12a side are formed as thick films.

According to the first embodiment, it is possible to increase reception efficiency per a unit area viewed from the incidence direction A1 and it is possible to reduce detection cell intervals. This makes it possible to increase the number of detection cells per a unit area and increase resolution.

A material of the reflection thin film 16 is not limited to Al. The reflection thin film 16 may be formed from metal such as Ag. Moreover, the material is not limited to metal. For example, the reflection thin film 16 may be realized by titanium oxide ($TiO_2$) or a multi-layer film using titanium oxide. The reflection thin film 16 may be formed by a semiconductor manufacturing apparatus using sputtering or the like or may be coated by plating or the like. In the first embodiment, when mechanical strength and reliability of the photodiode array 12 are taken into account, since a limit of the thickness of the photodiode array 12 is about several hundred micrometers, it is preferable to set film thickness of the reflection thin film 16, which can be neglected compared with this thickness, to 10 micrometers or less.

A detection wavelength region of the photodiode elements 12a is not limited to visible light. The detection wavelength region of the photodiode elements 12a only has to have a detection ability corresponding to a wavelength of light converted and outputted by the scintillator elements 13 or may be able to detect ultraviolet light or infrared light.

$CdWO_2$ is used as a material of the scintillator element 13. Besides, CsI, NaI, $Bi_4Ge_3O_{12}$, $BaF_2$, $Gd_2SiO_5$, and $Lu_2SiO_5$ may be used. Various ceramic scintillators may be used.

According to the first embodiment described above, detection signals from the respective photodiode elements 12a are extracted from the respective terminals 26. In the second embodiment, a wiring pattern for extracting detection signals from the respective photodiode elements 12a is formed on the photodiode array 12 to extract all the detection signals from one end of the photodiode array 12.

Figure 5:
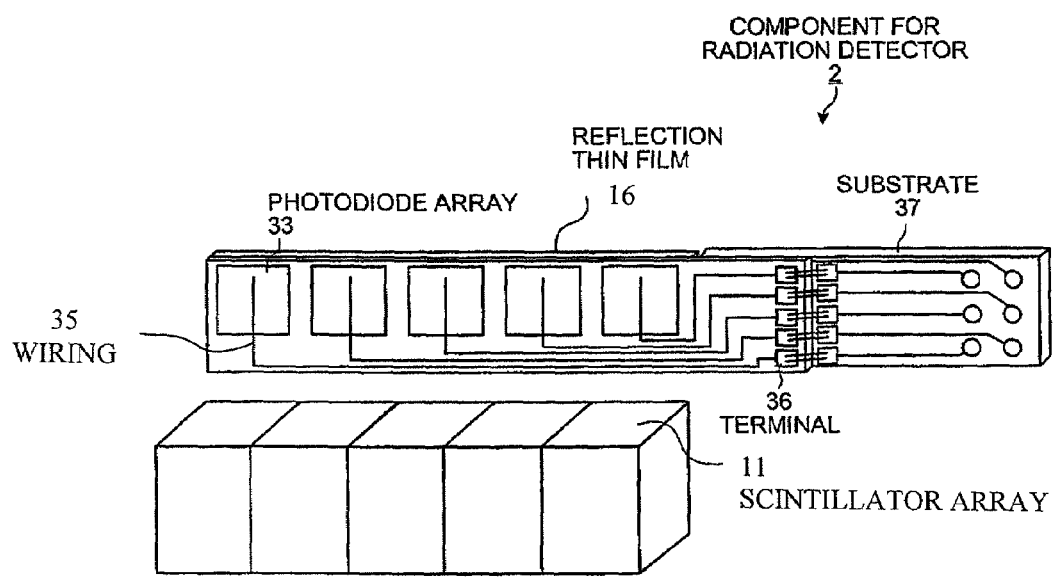
FIG. 5 is a disassembled perspective view of a radiation detector component according to a second embodiment of the present invention.
Figure 6:
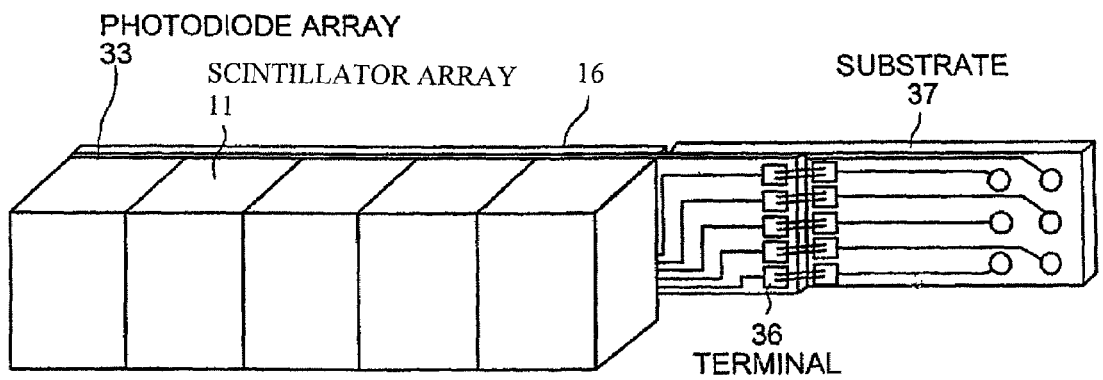
FIG. 6 is a perspective view of the radiation detector component according to the second embodiment.
Figure 7:
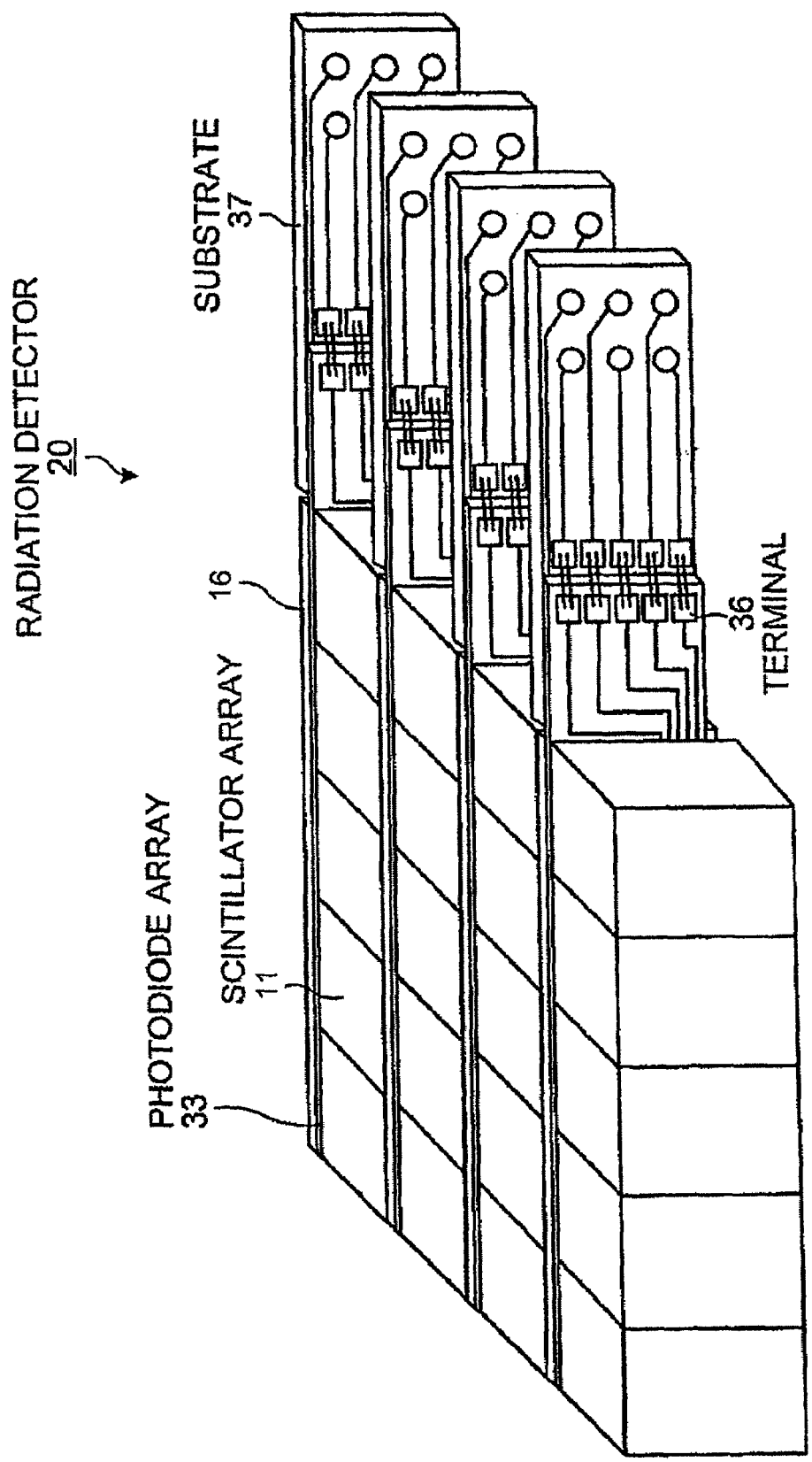
FIG. 7 is a perspective view of a schematic constitution of a radiation detector in which the radiation detector components according to the second embodiment are two-dimensionally arranged.

FIG. 5 is a disassembled perspective view of a radiation detector component 2 according to a second embodiment of the present invention. FIG. 6 is a perspective view of the radiation detector component 2 according to the second embodiment. FIG. 7 is a perspective view of a schematic constitution of a radiation detector 20 in which the radiation detector components 2 according to the second embodiment are two-dimensionally arranged.

As shown in FIGS. 5 to 7, terminals 36 corresponding to the terminals 26 are collectively provided at one end of a photodiode array 33. The respective terminals 36 and respective photodiode elements are electrically connected by wirings 35. A substrate 37 is further provided at the one end of the photodiode array 33 to overlap the photodiode array 33 at the one end. Terminals for pullout provided on the substrate 37 and the respective terminals 36 are electrically connected to each other.

This simplifies a constitution for extracting detection signals outputted from the respective photodiode elements and makes it easy to assemble the radiation detector 20.

It is possible to apply the radiation detector component and the radiation detector not only to an apparatus that detects an X-ray but also to apparatuses that detect various radiations. It is possible to apply the radiation detector component and the radiation detector not only to the X-ray CT apparatus but also to, for example, a PETCT apparatus.

According to an embodiment of the present invention, it is possible to reduce an arrangement pitch of cells including scintillator elements and photodiode elements as pairs, and to increase a detection sensitivity or a resolution.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radiation detector component comprising:
a scintillator array in which a group of scintillator elements that convert an incident radiation into a light is one-dimensionally arranged and a reflection film is formed on a surface of each of the scintillator elements perpendicular to an incidence direction of the radiation; and
a photodiode array that includes a group of photodiode elements that are arranged corresponding to arrangement positions of the respective scintillator elements, with detection surfaces formed substantially parallel to the incidence direction of the radiation, at least the detection surfaces of the photodiode elements being fixed on the scintillator array, wherein
the photodiode array includes a reflection thin film formed on a rear surface of the photodiode array, the rear surface being opposite to the detection surfaces of the photodiode elements.

2. The radiation detector component according to claim 1, wherein the reflection thin film is a metal thin film.

3. The radiation detector component according to claim 2, wherein the metal thin film is either one of an aluminum thin film and a silver thin film.

4. The radiation detector component according to claim 1, wherein thickness of the reflection thin film is equal to or less than 10 micrometers.

5. A radiation detector comprising:
a plurality of radiation detector components, wherein each of the radiation detector components includes
a scintillator array in which a group of scintillator elements that convert an incident radiation into a light is one-dimensionally arranged and a reflection film is formed on a surface of each of the scintillator elements perpendicular to an incidence direction of the radiation; and
a photodiode array that includes a group of photodiode elements that are arranged corresponding to arrangement positions of the respective scintillator elements, with detection surfaces formed substantially parallel to the incidence direction of the radiation, at least the detection surfaces of the photodiode elements being fixed on the scintillator array,
the photodiode array includes a reflection thin film formed on a rear surface of the photodiode array, the rear surface being opposite to the detection surfaces of the photodiode elements, and
the radiation detector components are arranged perpendicular to the incidence direction of the radiation to form a two-dimensional array.

6. The radiation detector according to claim 5, wherein the reflection thin film is a metal thin film.

7. The radiation detector according to claim 6, wherein the metal thin film is either one of an aluminum thin film and a silver thin film.

8. The radiation detector according to claim 5, wherein thickness of the reflection thin film is equal to or less than 10 micrometers.

9. A radiation detector component comprising:
a first scintillator element for converting an incident radiation into light;
a first photodiode element with a detection surface substantially parallel to the incidence direction of the radiation, the photodiode element for converting the light generated by the first scintillator element into a first electric signal; and
a second scintillator element for converting an incident radiation into light, the second scintillator element disposed on a side of the first photodiode element that is opposite to the detection surface, wherein
a reflection film is formed on a surface of at least one of the first and second scintillator elements that is substantially perpendicular to the incidence direction of the radiation, and a thin reflection film is formed on the side of the first photodiode element that is opposite to the detection surface.

* * * * *